(No Model.) 6 Sheets—Sheet 1.
J. H. PITKIN & J. F. STEWARD.
LOW LEVEL SELF BINDING HARVESTER.
No. 388,913. Patented Sept. 4, 1888.
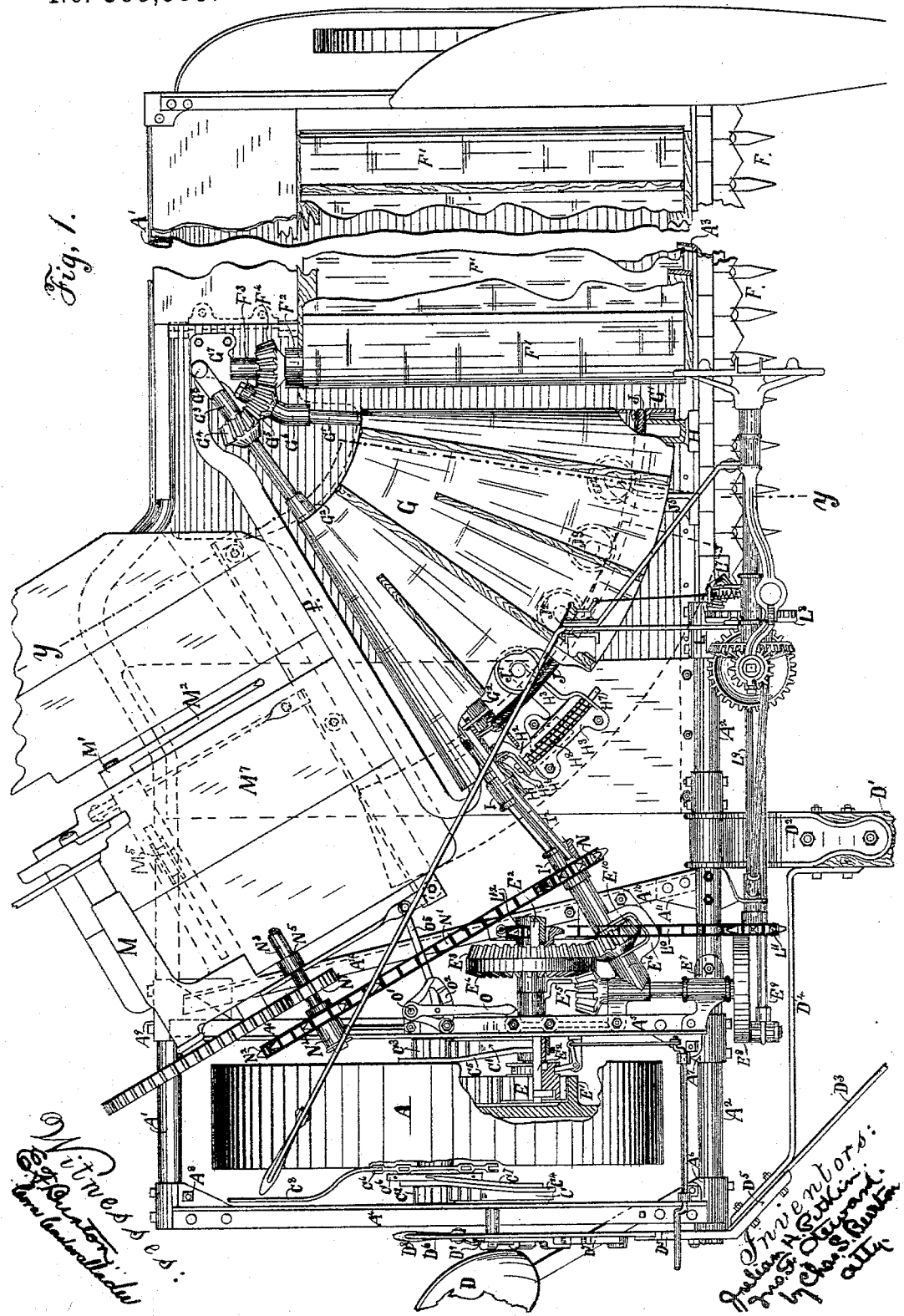

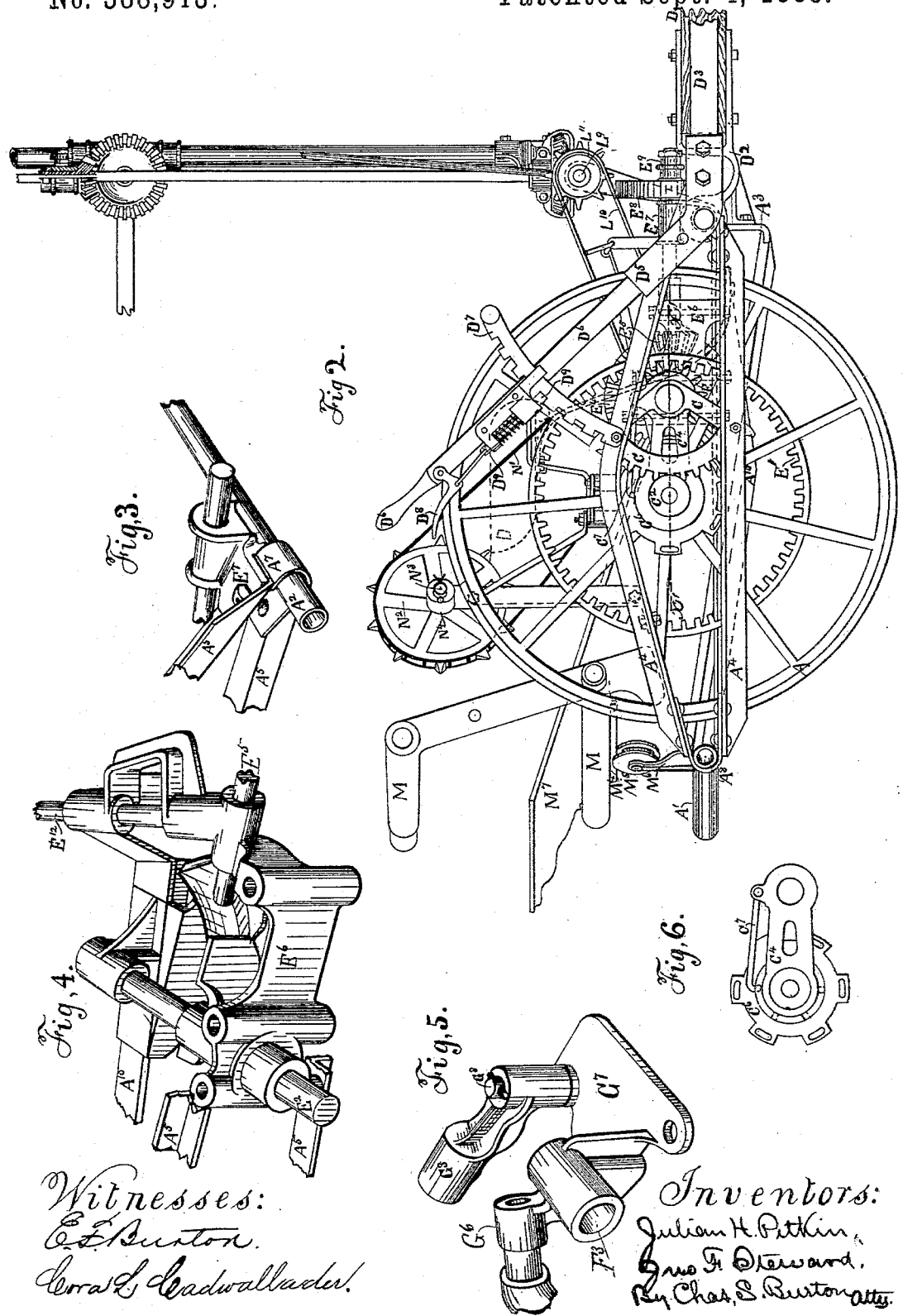

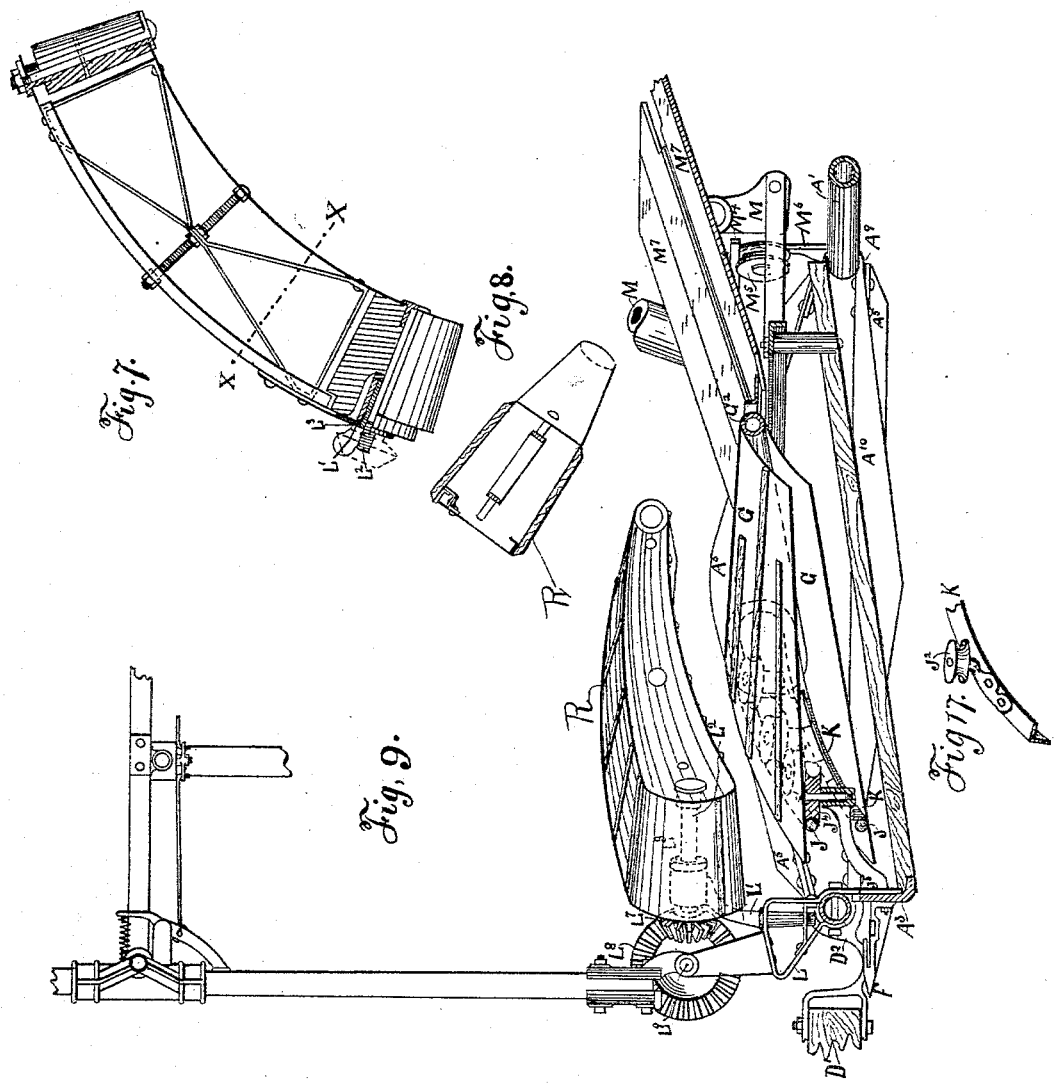

(No Model.) 6 Sheets—Sheet 4.
J. H. PITKIN & J. F. STEWARD.
LOW LEVEL SELF BINDING HARVESTER.
No. 388,913. Patented Sept. 4, 1888.
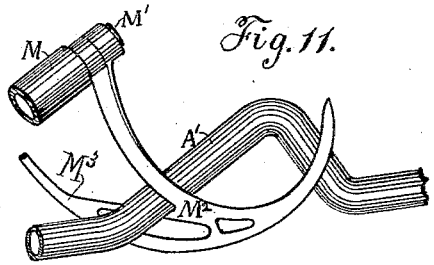
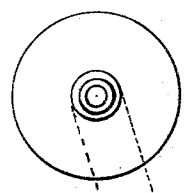
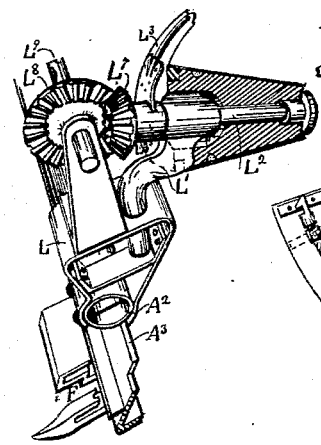
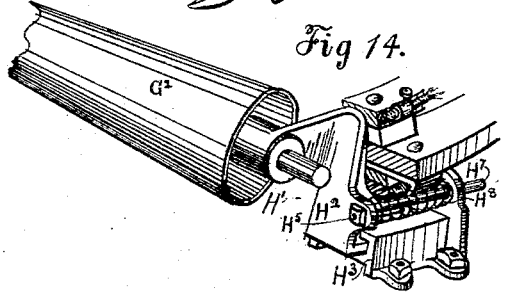
Witnesses:
C. S. Burton
Cora Cadwallader
Inventors:
Julian H. Pitkin.
Jno. F. Steward.
by Chas. S. Burton.
Atty.

(No Model.) 6 Sheets—Sheet 5.

J. H. PITKIN & J. F. STEWARD.
LOW LEVEL SELF BINDING HARVESTER.

No. 388,913. Patented Sept. 4, 1888.

Witnesses:
E. F. Burton
Cora Cadwallader

Inventors:
Julian H. Pitkin
Jno. F. Steward
by Chas. D. Burton.
Atty.

(No Model.) 6 Sheets—Sheet 6.

J. H. PITKIN & J. F. STEWARD.
LOW LEVEL SELF BINDING HARVESTER.

No. 388,913. Patented Sept. 4, 1888.

Witnesses:
Jean A. Warriner.
C. F. Burton.

Inventor:
Julian H. Pitkin.
John F. Steward.
By Chas. S. Burton.
their atty.

UNITED STATES PATENT OFFICE.

JULIAN H. PITKIN AND JOHN F. STEWARD, OF CHICAGO, ILLINOIS.

LOW-LEVEL SELF-BINDING HARVESTER.

SPECIFICATION forming part of Letters Patent No. 388,913, dated September 4, 1888.

Application filed May 10, 1887. Serial No. 237,677. (No model.)

*To all whom it may concern:*

Be it known that we, JULIAN H. PITKIN, and JOHN F. STEWARD, of Chicago, in the county of Cook and State of Illinois, have invented certain new and useful Improvements in Low-Level Self-Binding Harvesters, of which the following is a full description, reference being had to the accompanying drawings, in which—

Figure 16:
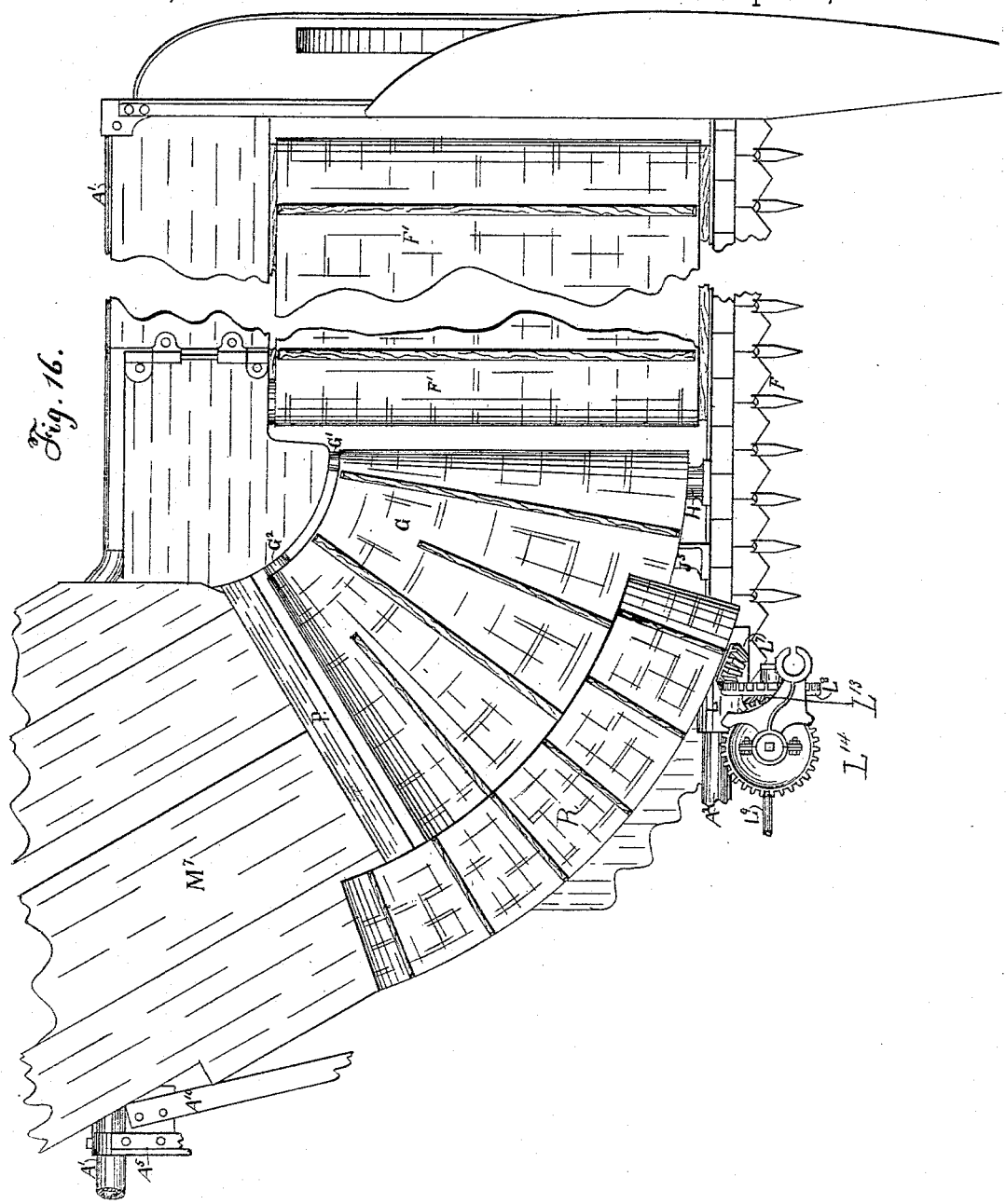
Figure 18:
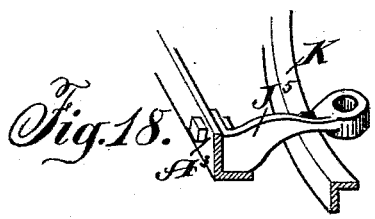
Figure 20:
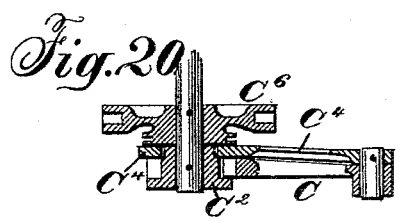
Figure 19:
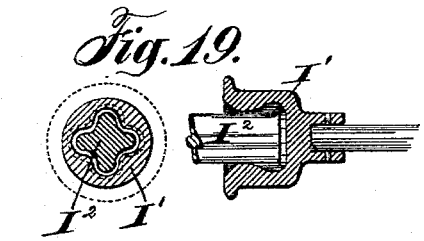
Figure 21:
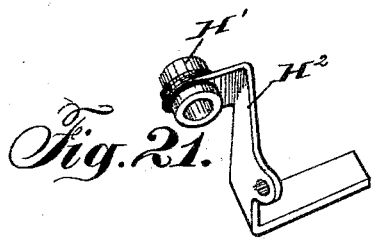

Figure 1 is a plan view; Fig. 2, a stubble end view, and the remaining figures details, as follows: Fig. 3, the front crank-shaft bearing; Fig. 4, the main gearing-frame and journal-bearings; Fig. 5, bearings for the journals of the conveying-canvas rollers; Fig. 6, a detail of the latch for securing the main-wheel axle from rotation; Fig. 7, a detail of construction of the overhanging butt-conveying frame; Fig. 8, a sectional end view on the line $x\ x$ of Fig. 7, showing the means for controlling or guiding the overhanging butt-moving canvas; Fig. 9, a section on the line $y\ y$ in Fig. 1, as viewed from the grain side of the machine; Figs. 10, 11, sections illustrating the position of the needle relative to the main rear sill of the frame; Fig. 12, a detail showing the arrangement and the pivot of the overhanging butt-moving canvas. Fig. 13 shows the quadrant canvas. Fig. 14 shows the device for taking up slack in said canvas. Fig. 15 is a detail of the star-iron, forming part of the tumbling shaft in our machine; Fig. 16, a plan view showing and illustrating the positions and arrangement of the conveying-canvases, cutting apparatus, binder-table, &c.; and Fig. 17, a detail of the anti-friction rollers for guiding the quadrant canvas. Fig. 18 is a perspective of a bracket and guiding-track, which form part of the devices for controlling the movement of one of the quadrant canvases. Fig. 19 comprises a transverse and a longitudinal section through a certain tumbling shaft, by which power is communicated to the driving-roll of the quadrant canvas. Fig. 20 is a section at the line $x'\ x'$ on Fig. 2. Fig. 21 is a perspective of a bracket which contains a yielding bearing for the driving-roll of the overhanging butt-operating canvas.

The main object of our invention is to avoid elevating the grain over the main supporting-wheel, and to do this we so construct our machine that the grain falls on a side delivery-platform canvas, by which it is conveyed to an endless quadrant canvas, which in turn carries it to the binding mechanism, and thus causes the completed sheaves to be delivered diagonally in the rear of the master-wheel.

In the drawings, A is the master-wheel, upon which is mounted a frame consisting of a gas-pipe, A', which extends the whole length of the frame, forming the rear portion of the same. $A^2$ is a gas-pipe occupying a corresponding position at the front of the frame. It does not extend any farther grainward, however, than the stubble end of the cutting apparatus, where it is connected to and above an angle-iron bar, $A^3$, against which are abutted the guards of the cutting apparatus, and to the lower edge of which the platform bottom board is secured. These gas-pipes are connected by two trussed frames, $A^4$ and $A^5$, (which are parallel with the line of advance of the machine,) by means of clips $A^6$, $A^7$, $A^8$, and $A^9$. Extending from the clip $A^9$ forward and grainward is the angle-iron beam $A^{10}$. This piece is secured to the front gas-pipe by bolts which pass down through the latter and through the clip $A^{11}$. The trusses and this clip arrangement form no part of this invention, but are shown, described, and claimed in the patent to Kennedy, Kennedy, and Steward, No. 351,268, and will not be further described in this application.

The grain-divider is employed at the grain end of the machine at the usual point, in form consisting of a truss similar to those adjacent to the main wheel and secured to the gas-pipe sill in the rear and the finger-bar in front in the usual manner. Crossing and forming struts for the trusses adjacent to the main wheel are quadrants C and C', up and down which the axle-pinions $C^2$ and $C^3$ run. These axle-pinions are held into mesh with the quadrants by the radius-links $C^4$ and $C^5$. These segments have a hub concentric with the pitch-line of their teeth, which is surrounded by the eyes of the radius-links $C^4$ and $C^5$, on which the latter vibrate as the wheel rises and falls relative thereto, because of its pinion being rotated, for the purpose of carrying it higher or lower relative to the frame. The pinions $C^2$ and $C^3$ are pinned to the axle, and upon the pinion $C^2$ is cast a socketed disk, $C^6$. By inserting a lever in the socket of this disk the latter may be rotated and the elevation of the machine changed, whether high or low. In order to hold the axle in any position to which it may be rotated, at the side of the socketed disk $C^6$ is a series of holes, in which the hook $C^7$ engages. This hook is pivoted to the radius-links $C^4$, as shown in Fig. 6.

D is the driver's seat upon the stubble end of the frame and in easy reach of the lever $C^8$.

The grain-wheel or inner supporting-wheel may be adjustably secured to the divider in a similar or in any of the usual ways, and need not be described.

D' is the tongue bolted to the casting $D^2$, which is curved downward and passes backward, as shown in Fig. 2, to clear the pitman, then raised upwardly, and loosely surrounds the gas-pipe $A^2$, as shown in Fig. 1. A casting, $D^5$, is also pivoted loosely on the gas-pipe $A^2$ outside the truss $A^4$, and provided with an arm extending obliquely forward and grainward in front of the gas-pipe. The flat bar $D^4$ is securely bolted alongside the tongue, and thence is bent stubbleward and extended parallel to the gas-pipe $A^2$ for a distance, and then bent so as to extend alongside the oblique arm of the casting $D^5$, and between said oblique arm and the obliquely-bent end of the flat bar $D^4$ the bar $D^3$ is placed, and all three—the oblique arm of the casting and the bars $D^4$ and $D^3$—are firmly bolted together. The bar $D^3$ extends thence obliquely forward and grainward to the tongue, to which it is rigidly secured. The castings $D^2$ and $D^5$ thus form the pivot of the tongue to the main frame. Extending upwardly and rearwardly and socketed in the casting $D^5$ is the lever $D^6$, having a thumb-latch detent, which engages with the notched bar $D^7$. (See Fig. 2.) By pressing upon the thumb-latch $D^8$ the spring-bolt $D^9$ is disengaged and the tongue rocked on its axis, or, rather, with the end of the tongue in the neck-yoke of the draft-team the movement of the lever rocks the machine on the axles of the supporting-wheels. This lever, it will be observed, is adjacent to the driver's seat, and thus within easy reach of the operator.

The main supporting-wheel is provided with an internal gear, E', which meshes into the spur-pinion E. This pinion is on a short shaft, $E^2$, which revolves in double bearings supported upon the truss $A^5$ and bar $A^{10}$. These bearings, as well as several others, are formed in a single frame, as shown in Fig. 4. Keyed to this shaft is a double bevel-gear having teeth $E^3$ and $E^4$. The latter series of teeth mesh into the pinion $E^5$ on the crank-shaft, which has bearings in the gearing frame-work $E^6$ and the bearing $E^7$ on the front gas-pipe sill.

$E^8$ is the crank-wheel, and $E^9$ the pitman, connected to the sickle in the usual manner. The teeth $E^3$ mesh into the pinion $E^{10}$, which is keyed to a short shaft, $E^{12}$, Fig. 4, having journals in the gearing-frame. This shaft drives the delivery apparatus and the binder, as will be duly pointed out.

F is the cutting apparatus, and F' the delivery-canvas, moving over a roller at the grain end of the platform and driven by the drum $F^2$ at its stubble end. The drum $F^2$ is journaled in a bearing, $F^3$, and is provided with a beveled pinion, $F^4$.

G is a quadrant canvas drawn over conical rollers G' and $G^2$, driven by the latter. The construction of these rollers will be seen by reference to Fig. 14, where $G^2$ is shown detached. The rear end of the shaft of the roller $G^2$ is journaled in the bearing $G^3$, and is provided with a beveled pinion, $G^4$. $G^5$ is another pinion meshing into pinions $F^4$ and $G^4$, and the bar upon which it is mounted extends forward, and is socketed at $G^6$ to form a bearing for the shaft G', and is so formed that the pinion $G^5$ may rotate upon its outer surface as an axis. The journal-bearings $F^3$, $G^3$, and $G^6$ are all as one piece with the casting $G^7$, (shown in Fig. 5,) except that the bearing $G^3$ is pivoted thereto by means of a screw-bolt, $G^8$. The reason we swivel the bearing $G^3$ is so that the angle of the shafts of the two conical rollers may be increased or decreased to compensate for the stretching or shrinking of the canvas. This quadrant canvas is slightly higher at its delivery end than at its receiving end, and hence the two shafts of the conical rollers cannot be upon the same plane. For this reason the pinions, which have just been described, are made somewhat askew, as shown in Fig. 1. The front end of the shaft of the roller G' is journaled in the bearing H, secured at the finger-bar. The conical roller $G^2$ is journaled at its forward and stubbleward extremity in the bearing H'. This box is swiveled to a sliding piece, $H^2$, which moves in guides in the casting $H^3$.

To the part $H^2$ is secured by the nuts $H^5$ and $H^6$ the spring-rod $H^7$, surrounding which is the spring $H^8$. The arrangement of this spring is such as to force the drum-bearing in such a direction as to increase the angle formed by the axes of the two conical rollers for the purpose of taking up the slack in the canvas which runs around them. Keyed to the forward end of this same shaft is a coupling, I, and to the shaft, upon which is the pinion $E^{10}$, is keyed the coupling I'. These couplings are socketed so as to receive loosely the four-rayed star-iron $I^2$, as shown in Figs. 1 and 15. The two shafts are thus coupled together, forming a tumbling shaft, and in such a way that the driven shaft may be moved relative to the driving one.

The construction of the quadrant canvases is shown in Fig. 13, where J is a rope, preferably of rawhide, coupled at its two ends by means of coupling-hook. This rope runs in grooves near the base of the conical rollers to compel the quadrant canvas to retain its form where describing an arc, and is guided by passing over anti-friction rollers J', J², J³, and J⁴, as shown in Fig. 1 and in dotted lines in Fig. 9. For convenience, the roller J' is journaled on an arm extending from the casting H³, and the roller J⁴ on the arm J⁵, extending backward from the finger-bar. For the purpose of guiding the lower ply of the rope, an angle-iron, K, curved to correspond to the desired course of the rope, is secured to the arm J⁵, and upon this is mounted the roller J⁴, and to this angle-iron, upon studs projecting upwardly, are journaled the rollers J² and J³, which form guides for the upper ply in addition to and located between the rollers J' and J⁴, as shown in Fig. 17. To make this quadrant canvas as effective as possible, a supplemental overhanging endless canvas, R, is laid immediately above it and adapted to tread upon the butts of the grain. This supplemental overhanging endless canvas is also made to serve the purpose of a grain-adjuster. It is shown in the dotted outline in Fig. 1, but may be more clearly understood by reference to Sheet 3, where it is shown in perspective and in detail, and to Fig. 16.

L is a standard bolted to the front gas-pipe, adapted to receive a swiveled support, L'. This support passes upward and surrounds the bearing L³ of the shaft L²—that is to say, the bearing L³ is free to rock in the standard L' and the shaft L² to rotate within the former. (See Fig. 12.) The bearing L³ is made with a long wing, as shown in Fig. 7, so that the frame of the supplemental canvas may be connected with it. In other words, the journal-bearing L³ forms a support for the supplemental canvas, and it may rise and fall at its rearmost end, rocking round the shaft L² and within the sleeve of the standard L' as an axis. By having this axis of rise and fall of the supplemental canvas coincident with the axis of the canvas-driving drum, the adjustment of said canvas to various positions at its delivery end will not disarrange the driving mechanism. Upon the shaft L² is the pinion L⁷, which meshes into and is driven by the gear L⁸. The axis of the pivoted stem L' is such that if extended upwardly it would coincide exactly with the pitch-circles of the pinion L⁷ and the gear L⁸. The teeth of both pinion and gear may be rounded, so that the position of the pinion L⁷ may change relative to its driver L⁸. This permits the adjuster to swing at its delivery end to some extent, so as to direct the grain into the binder for central binding. The gear L⁸ is keyed to the shaft L⁹ directly above the pitman, and is rotated by a chain, L¹⁰, thrown over the sprocket-wheel L¹¹ on the said shaft, and the sprocket-wheel L¹², by which it is driven, the latter of which is cast as one piece with the double-beveled wheel E³ and E⁴. The nest of gearing by which the revolution of the roller G² is imparted to roller F² is covered by a sheet-iron hood to prevent entanglement of long straws.

The binding device will form the subject-matter of a separate application, and will not be further described, except so far as the adjustment is concerned.

M is the binder-frame of U form. M' is the needle-shaft, journaled in the lower arm of the frame carrying the needle M², which has a long rearwardly-curved extension, M³. M⁷ is the binder-table, slotted for the passage of the needle. The lower arm of the binder-frame is provided with a track, M⁴, Figs. 2 and 10, which engages a grooved roller, M⁵, journaled in the support M⁶, reaching upward from the back sill. The position of the binder-frame and the binder-table is shown in Fig. 1, and the supporting roller M⁵ is shown to be so set that although diagonal to the main platform its plane is parallel with the track on the binder-frame; hence the latter can travel over it properly as the binder is moved to bind the grain centrally. The adjustment of the binder (for binding centrally) not being in a direction parallel with the back sill, L', the movement would make the needle come in contact therewith. In order to avoid this, we give this gas-pipe such a bend that it shall be substantially parallel with the movement of the binder-arm or needle as it is adjusted. By placing the sill A' and needle in the relative positions shown we are able to place the binder-table lower than if the needle-extension were required to be all above the back sill, and by bending the latter as shown we get the adjustment without the parts coming in contact. Keyed to the short shaft E¹², driven by its pinion E¹⁰, is the sprocket-wheel N. Around this is thrown the binder-driving chain N', which engages the binder-driving wheel N², which in turn gives movement to the binding apparatus.

O is a lever pivoted at O' to the quadrant O², and reduced in thickness so as to adapt it to be sprung out of the notches of the latter when it is to be moved. Connecting this lever with the binder-frame is the link O⁵.

The binder-driving shaft N³ is supported in the journal-bearing N⁴, which reaches upward from the main frame, and by the bearing N⁵, supported on the binder-frame. The shaft N³ is grooved, and the pinion N⁷ is feathered, that it may slide on said shaft and still be driven by it. As the binder is adjusted, the pinion N³ and the bearing N⁵ slide on said shaft.

P is long plate of metal reaching from the pivotal screw G⁸ forward parallel with the periphery and reaching around backward into the butt of the hollow-ended roller G², and is there secured to the bearing H' of said roller. As the roller moves to tighten the quadrant canvas, this moves with it, and is wide enough to move rearward sufficiently to lie on the binder-table such a distance that the adjustment of the roller of the quadrant canvas will not move it off from the table. This is to avoid unnecessary widening of the gap at the side of the roller to permit the slats to pass.

It may be desirable in some instances to move the binding device to a position much nearer to the delivery-canvas than is now shown. In that event the sprocket-wheels N and N² would become gears, with an intermediate one between them, the three meshing together. By this means the binder would be driven by the gear, and although we show sprocket-wheels, and shall claim them as sprocket-wheels, we do not limit ourselves to them, but consider ourselves entitled to known equivalents—as, for instance, gears and pinions, or the making of N and N² beveled gears and connecting them by means of a shaft having beveled pinions upon either end.

The sprocket-wheel L¹² is the part which drives the reel by means of the chain L¹⁰, passing over the wheel L¹¹ on the shaft L⁹, to which, in addition to the wheel L⁸, which drives the belt R, there is fixed fast the beveled gear-wheel L¹³, which drives the beveled gear-wheel L¹⁴, which is fixed on the lower end of the reel-driving shaft. The construction of the reel-driving mechanism from this point is familiar and need not be described.

We have shown four rollers for the purpose of keeping the rope J on the quadrant canvas, and hence the canvas itself in such a position that the proper arc shall always be preserved. Three rollers may be sufficient, and perhaps two. In fact, the curvature of the quadrant canvas is so slight that we do not find it in practice necessary to have anything more than a plain guide-groove for the rope. We have shown the butt-adjusting and butt-moving canvas as forming part of a circle; but it may, if desired, be made straight, and we do not confine ourselves to either form.

In order to shorten our machine as much as possible, we shorten the platform-canvas F and carry the receiving end of the quadrant canvas to meet it some distance from the stubble end of the cutting apparatus. The operation of these canvases is such that we are enabled to begin wheeling the grain before it reaches the end of the receiving-platform proper (that part lying immediately back of the cutting apparatus) and at a point immediately beyond the falling grain. The butts are engaged between the quadrant canvas G and the adjusting-canvas R, and are forced positively, while the heads are permitted to lag, the latter of which occurs in straw so long as to reach over onto the rear part of the platform, which does not move. The action of the quadrant and butting canvases is equally important in short grain, as they force it with the grass and trash which is likely to be included in it positively onward. The canvas R we extend to a point upon the binder-deck to such a distance that the grain shall be carried positively thereon.

For the sake of clearness in our claims, we shall be obliged to make them specific in form, yet we do not intend thereby to limit ourselves to the precise construction shown, but shall consider such claims as covering all known equivalents, not merely as equivalence of special pieces or parts, but equivalent combinations and equivalence of elements.

Several of the features of our invention we believe to be broadly new, and we wish it understood that these reservations apply equally to them.

What we claim is—

1. In combination with two tapering drums or rollers whose axes converge toward their smaller ends, the endless belt carried about said rollers, the smaller end bearing of one of said rollers being pivoted, and the larger end bearing of the same roller being movable about said pivot toward and from the larger end bearing of the other roller, and a spring tending to force said larger end bearings apart, substantially as set forth.

2. In combination with the shaft of the tapering driving roller of the sectoral conveyer, the shaft in the harvester-train from which said roller-shaft derives power and a tumbling shaft connecting them, the bearing of the driving-roller N at its smaller end being pivoted, and the bearing at its larger end being movable toward and from the corresponding bearing of the other roller, whereby the driving-roller is made adjustable to take up the slack of the sectoral conveyer-belt without disarranging its driving connections, substantially as set forth.

3. The combination of the grain-delivery canvas G, the binder-table, and the roller at the delivery end of the grain-delivery canvas, adapted to be moved for the purpose of increasing the tightness of said canvas, and the plate P, connected to the bearings of the said movable roller and adjustable therewith and extending toward the binder-table to close the gap between said roller and table, substantially as set forth.

4. The combination of the rollers G' and G², the roller G², hung in suitable bearings, whereby it is adapted to be moved farther from the roller G' to take up slack in the delivery-canvas thrown therearound, the bearing H' of said roller G², supported in an adjustable bearing, and the spring H⁸, adapted to move the said bearing in the direction specified, the binder-table, and the plate P, connected to said movable roller-bearing and extended laterally toward the binder-table, substantially as set forth.

5. In combination with the cutter, the conveyer F' in the rear thereof, delivering the grain sidewise, said conveyer being considerably shorter than the cutter, the sectoral conveyer G, having its receiving side adjacent to the delivery side of the conveyer F' and considerably grainward of the line of the stubble end of the cutter, the binder-table located adjacent to the delivery side of the sectoral conveyer G, and the overhanging belt R, having its receiving end at the line of the stubble end of the cutter and its delivery end terminating well onto the binder-table, substantially as set forth.

6. The combination of the back sill, the binder-frame moving thereover in a direction diagonal to the back sill, and the back sill bent so as to be parallel to the line of movement of the binder to avoid clashing with the needle, and the needle having the extension $M^3$, adapted to move thereunder, substantially as described.

JULIAN H. PITKIN.
JOHN F. STEWARD.

Witnesses:
　WILLIAM WORTH BURSON,
　W. H. HALL.